US 9,938,461 B2

United States Patent
Whitwell et al.

(10) Patent No.: US 9,938,461 B2
(45) Date of Patent: Apr. 10, 2018

(54) PROCESS FOR SOIL CONDITIONING BY AERIAL APPLICATION OF WATER SOLUBLE OR SWELLABLE POLYMERS

(71) Applicant: SNF HOLDING COMPANY, Riceboro, GA (US)

(72) Inventors: Paul Whitwell, Savannah, GA (US); Willard Griffin, Richmond Hill, GA (US); Peter Nichols, Savannah, GA (US)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 14/531,131

(22) Filed: Nov. 3, 2014

(65) Prior Publication Data
US 2016/0120130 A1 May 5, 2016

(51) Int. Cl.
*C09K 17/32* (2006.01)
*C09K 17/22* (2006.01)

(52) U.S. Cl.
CPC .............. *C09K 17/32* (2013.01); *C09K 17/22* (2013.01)

(58) Field of Classification Search
CPC ........ A01G 7/00; A01G 9/1086; C09K 17/00; C09K 17/16
USPC .............. 47/1.01 R, 1.01 F, 58.1 R, 58.1 SC
See application file for complete search history.

(56) References Cited

U.S. PATENT DOCUMENTS

| | | | | |
|---|---|---|---|---|
| 3,749,172 | A * | 7/1973 | Hessert | C09K 8/24 166/270 |
| 4,559,074 | A * | 12/1985 | Clarke | A01G 9/1086 525/296 |
| 4,694,991 | A | 9/1987 | Breckenridge | |
| 5,185,024 | A | 2/1993 | Siemer et al. | |
| 6,199,318 | B1 * | 3/2001 | Stewart | A01C 1/06 47/57.6 |
| 6,881,008 | B1 | 4/2005 | Maile et al. | |
| 7,587,856 | B2 * | 9/2009 | Rubin | A01G 31/001 47/1.01 R |
| 8,163,192 | B2 * | 4/2012 | Vincelli, Sr. | A01C 1/04 111/200 |
| 8,256,158 | B2 * | 9/2012 | Spittle | A01G 13/0262 47/58.1 SC |
| 8,497,226 | B2 * | 7/2013 | Torii | A61L 15/60 252/194 |
| 2005/0049379 | A1 * | 3/2005 | Adachi | A61L 15/60 526/319 |
| 2005/0193791 | A1 * | 9/2005 | Petrea | A01G 1/002 71/11 |
| 2006/0075922 | A1 * | 4/2006 | Supik | A23L 3/3508 106/15.05 |
| 2006/0128839 | A1 * | 6/2006 | Ferrall | C09K 17/16 524/5 |
| 2006/0204755 | A1 * | 9/2006 | Torii | A61L 15/60 428/402 |
| 2006/0247351 | A1 * | 11/2006 | Torii | C08J 3/245 524/406 |
| 2008/0032888 | A1 * | 2/2008 | Nakamura | A61L 15/60 502/402 |
| 2008/0046277 | A1 * | 2/2008 | Stamets | A01N 63/04 705/308 |
| 2008/0300359 | A1 * | 12/2008 | Hoshi | C08F 220/38 524/588 |
| 2009/0120339 | A1 * | 5/2009 | Detweiler | C05F 11/02 111/118 |
| 2009/0151243 | A1 * | 6/2009 | Detweiler | A01N 25/08 47/58.1 SC |
| 2010/0144534 | A1 * | 6/2010 | Pullen | A01N 65/00 504/357 |
| 2010/0251435 | A1 * | 9/2010 | Aramaki | A01C 11/00 800/320 |
| 2011/0247379 | A1 * | 10/2011 | Cannock | C05D 3/00 71/23 |
| 2012/0040827 | A1 * | 2/2012 | Rodrigues | A01N 25/04 504/103 |
| 2012/0220454 | A1 * | 8/2012 | Chen | A01N 25/00 504/100 |
| 2013/0145687 | A1 * | 6/2013 | Cristobal | C09K 17/52 47/58.1 SC |
| 2013/0157902 | A1 * | 6/2013 | Ogle | C08F 2/38 507/120 |
| 2014/0126966 | A1 * | 5/2014 | Carlson | C09K 17/16 405/264 |
| 2014/0326029 | A1 * | 11/2014 | Hashaikeh | A01G 7/00 71/1 |
| 2016/0032036 | A1 * | 2/2016 | Okazaki | B32B 7/00 428/220 |
| 2016/0177179 | A1 | 6/2016 | Lecointe | |

FOREIGN PATENT DOCUMENTS

| | | |
|---|---|---|
| CA | 1096090 A | 2/1981 |
| EP | 1152024 A1 | 11/2001 |
| WO | 2015/015087 A1 | 2/2015 |
| WO | 2016/071157 A1 | 5/2016 |

OTHER PUBLICATIONS

International Search Report and Written Opinion issued in PCT/EP2015/074857, dated Jan. 20, 2016.

(Continued)

*Primary Examiner* — Marc R Burgess
*Assistant Examiner* — Morgan T Barlow
(74) *Attorney, Agent, or Firm* — Heslin Rothenberg Farley & Mesiti P.C.

(57) ABSTRACT

Process for soil conditioning includes applying to the soil a composition comprising at least a water soluble or swellable polymer. The composition has a particulate form and is applied by an aerial application. The process is suitable for soil conditioning and for reduction in soil erosion in agriculture, forestry, construction and civil engineering, mining, water storage and transportation, protection of rivers and delta against pollution, environmental conservation.

12 Claims, No Drawings

(56) References Cited

OTHER PUBLICATIONS

Lentz, R.D., et al., "Preventing Irrigation Furrow Erosion with Small Applications of Polymers", Soil Science Societ of America Journal, vol. 56, No. 6, pp. 1926-1932 (1992).

* cited by examiner

PROCESS FOR SOIL CONDITIONING BY AERIAL APPLICATION OF WATER SOLUBLE OR SWELLABLE POLYMERS

TECHNICAL FIELD OF THE INVENTION

The present invention is directed to a process for soil conditioning by applying at least one polymer on its surface.

Soil conditioning allows to preserve its integrity, to improve or to preserve its properties and to preserve environment and people by limiting elements transfers by hydraulic or aerial way. These benefits are obtained by protecting structural stability of aggregates, by limiting erosion and slaking phenomena, thus leading many side benefits.

The term "soil conditioning" encompasses the erosion control by water or wind path, formation control of slacking crusts, preservation of soil aggregate structure, water infiltration and diffusion control, modification of hydrophobic or hydrophilic properties of soils, restoration of sodic and alkaline soils, water turbidity control of flooded crops, transfer control of contaminants, but not limited to these uses.

The technical field in which is applied soil conditioning is mainly agriculture but also forestry, construction and civil engineering, mining, water storage and transportation, protection of rivers and delta against pollution, environmental conservation and other fields.

BACKGROUND

Following the Second World War, polymers, generally water soluble, were used to stabilize soils. Scientific literature, in the 50s, describes the use of different soil conditioning polymers as the Krilium® of the Monsato Chemical Company.

Several other polymers have been described afterwards to condition soils:
- Synthetic polymers: for instance, homopolymers and copolymers of acrylamide, acrylic acid and its salts, methacrylic acid and its salts, acrylonitrile, vinylpyrolidone, vinylformamide, 2-acrylamido-2-methyl propane sulfonic acid and its salts, vinyl acetate, maleic acid or ethylene oxide and derivatives likes hydrolysed polyacrylonitrile, polyvinyl alcohol;
- Natural polymers, natural gums, polysaccharides and their derivatives: galactomannan, guar gum, carob gum, xanthan gum, arabic gum, chitosan, carrageenan, pectins, starch, modified starches, alginates, celluloses, cellulose derivatives (cellulose ethers), agar-agar;
- Grafted polymers: for instance, starch-acrylamide-acrylates, starch-acrylonitrile, chitosan-acrylic acid copolymers.

Among all these polymers, polyacrylamides have been the focus of research and have been adopted for their efficiency in soil conditioning, reduction of soil erosion, increased water quality post irrigation and their low cost.

Polyacrylamide added to irrigation water has proven to decrease soil erosion drastically. Lentz and al. have applied polyacrylamide doses from 1 to 20 ppm in irrigation water (furrow irrigation) and have controlled erosion by 96% with the 10 ppm dose. Literature is abundant for this topic including the following article: "preventing irrigation furrow erosion with small application of polymers" published in the Soil Science Society of America Journal (1992, issue 56, pages 1926-1932).

The application of polyacrylamide (PAM), reduces the redistribution of fine soil particles in irrigation or rain water and prevents the formation of crust on the soil surface. Crust formation is caused by soil fines clogging the soil pores, leading to the formation of an impervious layer that restricts water and air movement into the soil profile. Seedlings have difficulty breaking through the crust, limiting the crops emergence. Seedling emergence can be improved by an application of polyacrylamide before the first rain event or prior to during the post-planting irrigation application.

The ability of polyacrylamide to flocculate the solids out of the irrigation and runoff water also prevents the discharge of nutrients and pesticides which have attached to the soil particles. By limiting the amount of soil, nutrient, and pesticide runoff, polyacrylamide helps improve the water quality post-irrigation, reduces the turbidly of the tail water, and helps improve the "health" of the drainage ecosystem. For these reasons polyacrylamide is a valuable conservation tool used to address the water quality in production agriculture.

By binding smaller particles together, polyacrylamide helps increase the particle size. The larger particle size decreases pore clogging, increases soil uniformity, and increases infiltration rates. All of these factors allow for better wetting of the soil profile and more efficient use of water, which can lead to yield increases and a decrease in irrigation cost.

Water soluble polymers have several benefits as described above. However, their application on the soil is limited to irrigation periods and it is often limited by the number of irrigation cycles during the growing season. Currently irrigation water is the primary method of application of these products.

If the irrigation water source is a canal water, typically the water is treated in the canal using the dry form of polyacrylamide and is applied using a granular applicator. The polymer is dosed into the water and the water is pulled out the canal.

If the irrigation water is a well, polyacrylamide, in emulsion form is injected either at the well head or in-field riser. The riser being the point in the field where the water is delivered. In most cases, a well supplies multiple risers for a total of 140 to –200 acres on average.

The delivery of the water from the canals and wells differs in application. Most canal irrigated scenarios use a form of suction tube to pull water out of the canal. Each tube is placed in either every row or every other raw. In a well scenario the water is pumped out of the riser in a "Poly pipe". Poly Pipe is a large inflatable roll of plastic pipe than runs along the high side of a field. The irrigator then pokes holes in the pipe to release the water. The number of holes and spacing of holes are determined by the target volume raw spacing. A computer program is typically used to determine the size and number of holes in a run of Poly pipe.

Patent application PCT/FR2014/051863 describes a soil conditioning process to apply a water or swellable polymer to the soil consisting in preparing polymer in a concentrated liquid form and in applying this preparation on the surface of a support in rotation around its axis of revolution in order to create droplets which are spreaded to the soil. This process allows to apply soil conditioning polymer without irrigation system but the concerned support in rotation is fixed for instance on a tractor and so application is time consuming if large surfaces have to be treated.

TECHNICAL PROBLEM SOLVING

These polymers are more efficient if they are applied during the initial irrigation or prior to a rain event. In cases where irrigation is the primary source of water, it is typically much easier to control the timing of the application but is still expensive due to the amount of time and equipment needed to meter the polymer. Electricity is not always available to power pumps; this reduces the ability to properly deliver the polymer. Polymers are often packaged in 30 gallon drums or large 275 gallon totes bins which are difficult to handle in fields, and long term in-field storage can reduce the effectiveness of the product. In regions where rainfall is the primary source of water, the ability to apply PAM to the soil, post-planting but before a rain event, is near impossible, with traditional application mean.

There is still a problem to apply water soluble or swellable polymers in a timely manner because of amount of time and equipment.

DESCRIPTION OF THE INVENTION

The present invention intends to solve the problem previously described.

The object of the invention is a process for soil conditioning consisting of applying by an aerial application to the soil, a composition in particulate form, said composition comprising at least a water soluble or swellable polymer.

In the following of the description, "particulate form" means powder, bead, tablet, prill or a mixture thereof having a size preferably between 0.1 and 10 millimeters, advantageously between 0.5 and 4 millimeters.

Polymer Description

The composition applied in the process of the invention comprises at least a water soluble or swellable polymer.

A "water soluble polymer" is a polymer which gives a solution without insoluble particles when it is dissolved under agitation at 25° C. and with a 50 g/L concentration in water.

A "water swellable polymer" is a polymer which swells and thickens solution when it is put in water at 25° C.

Water soluble or swellable polymers are selected from the group comprising:

- Homopolymers and copolymers of acrylamide, acrylic acid and its salts, methacrylic acid and its salts, acrylonitrile, 2-acrylamido-2-methyl propane sulfonic acid and its salts, vinylpyrolidone, vinylformamide, vinyl acetate, maleic acid or ethylene oxide and derivatives likes hydrolysed polyacrylonitrile, polyvinyl alcohol;
- Natural polymers, natural gums, polysaccharides and their derivatives: galactomannan, guar gum, carob gum, xanthan gum, arabic gum, chitosan, carrageenan, pectins, starch, modified starches, alginates, celluloses, cellulose derivatives (cellulose ethers), agar-agar;
- Starch-acrylamide-acrylates, starch-acrylonitrile, chitosan-acrylic acid copolymers.

For the process of the invention, polymers or copolymers of acrylamide are the most interesting.

Polymers of the invention can be linear, structured or cross-linked. The term structured polymers signifies polymers in branched, star or comb form.

Branched polymers are classically not linear polymers with lateral chains. Cross-linked polymers are classically not linear polymers under a tri-dimensional array form, insoluble in water, but which swell in water.

Polymers of the invention are preferably anionic. Their anionic charge content is preferably between 5 and 60 mol %.

Water soluble or swellable polymers may be prepared by reacting monomer or monomer blend under polymerization in conventional manners known a person of the art.

Then, they can be obtained in form of powder, bead, suspension, inverse emulsion or liquid.

In a preferred embodiment of the invention, water soluble or swellable polymers are homopolymers or copolymers of acrylamide.

Acrylamide based polymers are obtained by polymerization of acrylamide and other water-soluble monomers with a ethylenically unsaturated moiety selected from the following families:

- Anionic monomers. They are advantageously selected in the groups comprising monomers with an acid carboxylic moiety (e: acrylic acid or methacrylic acid and their salts . . . ), monomers with a sulfonic acid moiety (ex: 2-acrylamido-2-methyl propane sulfonic acid (AMPS) and its salts . . . ).
- Non-ionic monomers. They are advantageously selected in the group comprising methacrylamide, acrylamide derivatives likes N-alkylacrylamide, as for instance N,N-dimethylacrylamide or methylolacrylamide. vinylformamide, N-vinylpyridine, N-vinylpyrrolidone, hydroxyalkyl(meth)acrylates and (meth)acrylates with an alkoxy chain can also been used.
- Cationic monomers. They are preferably selected in the groups comprising diallyldialkyl ammonium salts likes diallyldimethyl ammonium chloride (DADMAC) and dialkylaminoalkyl (meth)acrylates likes dimethylaminoethyl (meth)acrylate ((M)ADAME) and their acidified or quaternized forms by means known by the skill man of the art., and also dialkylaminoalkyl (meth) acrylamide and their acidified or quaternized forms likes the (meth)acrylamide propyl trimethyl ammonium chloride (((M)APTAC).
- Zwitterionic monomers can also been used. Anionic and cationic charges are associated on one single monomer. Example of zwitterionic monomers: sulfobetains likes sulfopropyl dimethylammonium ethylmethacrylate, sulfopropyl dimethylammonium propylmethacrylamide or sulfopropyl 2-vinylpyridinium, phosphobetains likes phosphato ethyl trimethylammonium ethylmethacrylate and carboxybetains.

Preferably, water soluble or swellable polymers present in the composition of the invention are in powder or bead form.

In a preferred embodiment of the invention, polymers are water soluble polymers.

Preferably, molecular weight of water soluble polymers is above 500 000 $g \cdot mol^{-1}$ and preferably between 1 and 30 million $g \cdot mol^{-1}$, and more preferably above 5 million $g \cdot mol^{-1}$.

Composition Description

In the process of the invention a composition is applied by an aerial application.

The composition has a particulate form and comprises at least one water soluble or swellable polymer and optionally at least one other component.

The composition contains preferably between 20% and 100% and preferably between 50 and 100% by weight of water soluble or swellable polymers.

Preferably, water soluble and swellable polymers are in powder or in bead form.

To improve the spreading of the composition, the composition is in powder form and has a particle size between 0.1 and 10 millimeters, preferably between 0.5 and 4 millimeters. Particle size refers to the mean diameter measured with a laser particle sizer according conventional technics known by the skill man of the art. An example of device for measuring the mean diameter is the Mastersizer from Malvern Instruments.

The composition is preferably in tablet or prill form.

To improve spreading and polymer diffusion in the soil, the composition contains a filler or a binder.

The filler is selected in a non-limiting manner, from alkali metal sulphate or chloride salts.

The binder is not limited to a single component and might comprise functional components. Functional binders include pesticides, fertilizers, urea, various salts of inorganic and organics acids.

Preferably the composition contains between 1 and 80% by weight of filler and more preferably between 10 and 50% by weight.

Preferably the composition contains between 1 and 50% of binder and more preferably between 5 and 30% by weight.

Other components of the composition can be agricultural active ingredients likes natural insecticides, insecticides with organic phosphorus, insecticides with carbamates, nematicides, sterilizing agents with organic chloride, sterilizing agents with organic phosphorus, other sterilizing agents, herbicides, rodenticides.

Preferably, other components of the composition are in powder form.

For an application of the composition by airway, the bulk density of the composition should be preferably between 300 and 1000 kg·m$^{-3}$ and more preferably between 300 and 800 kg·m$^{-3}$.

Moreover, residual water content in composition should be the lowest to avoid particles agglomeration (polymers and other components). Preferably, residual water content of the composition in particulates should be lower than 15 weight percent.

In a preferred embodiment, the composition is a single component which is a water soluble or swellable polymer in powder form.

Process Description

The process of the invention consists in aerial application to the soil of a composition in particulate form.

Aerial application means application by any aerial mean but preferably applications are performed by airplane, helicopter, hang gliding, sailplane or drone.

The ability to apply water soluble or swellable polymers in composition having a particulate form via an aerial application allows the producer to more readily use them and be much timelier in the application. The application allows for flexibility and reduce the amount of labour and equipment needed to use these polymers.

In order to apply composition in particulate form by airplane, spreaders are attached to means of air transport. The spreader can be the agri-chemical spreader described in the filed patent U.S. Pat. No. 4,694,991.

For a uniform application, the altitude of application of the particulate composition is preferably below 50 m and more preferably between 20 m.

The amount of composition which is applied for each application to the soil is comprised between 0.1 and 500 kg·ha$^{-1}$, preferably between 1 and 100 kg·ha$^{-1}$ and more preferably between 10 and 50 kg·ha$^{-1}$.

The process of the invention is suitable for soil conditioning in agriculture, forestry, construction and civil engineering, mining, protection of rivers and delta against pollution, environmental conservation, water storage or transportation.

If aerial application concerns soil conditioning in agriculture, this application occurs preferably in crops fields between planting and the subsequent first rain event or irrigation. This is the time in which the soil is least stable.

After the first aerial application of the composition to the soil, the process of the invention comprises preferably additional applications. In this case, each aerial application is performed at least 20 days and not more than 40 days after the previous one.

The process of the invention allows for the improvement in the application of water soluble and swellable polymer for soil erosion. Aerial application can be performed more rapidly and easily than previous methods.

The invention claimed is:

1. A process for conditioning of soil to control erosion by water or wind path, control formation of slacking crusts, and preserve soil aggregate structure, comprising: applying to the soil a composition, said composition comprising at least one of a water soluble or a water swellable polymer, the at least one polymer being obtained by polymerization of acrylamide and monomers with an ethylenically unsaturated moiety selected from the families consisting of:

anionic monomers selected from the group consisting of monomers with an acid carboxylic moiety and monomers with a sulfonic acid moiety, and non-ionic monomers selected from the group consisting of: methacrylamide, N-alkylacrylamide, N,N-dimethylacrylamide, methylolacrylamide, vinylformamide, N-vinylpyridine, N-vinylpyrrolidone, hydroxyalkyl (meth)acrylates and (meth)acrylates with an alkoxy chain, wherein molecular weight of the water soluble polymer is above 500,000 g·mol$^{-1}$, and wherein the composition is in particulate form, and wherein said applying comprises performing an aerial application of the composition by airplane, helicopter, hang glider, sailplane or drone.

2. The process according to claim 1, wherein the water soluble polymer has a molecular weight between 500,000 and 30 million g·mol$^{-1}$.

3. The process according to claim 1, wherein the at least one of the water soluble polymer and the water swellable polymer in the composition is in powder or bead form.

4. The process according to claim 1, wherein particle size of the particulates of the composition is between 0.5 and 4 millimeters.

5. The process according to claim 1, wherein the composition comprises between 50% and 100% by weight of the at least one of the water soluble polymer and the water swellable polymer.

6. The process according to claim 1, wherein the composition has a bulk density between 300 and 1000 kg·m$^{-3}$.

7. The process according to claim 1, comprising performing at least one additional aerial application.

8. The process according to claim 7, wherein the additional aerial application is performed at least 20 days and not more than 40 days after a previous aerial application.

9. The process according to claim 1, wherein amount of the composition which is applied to the soil is comprised between 0.1 and 500 kg/ha.

10. The process according to claim 1, comprising performing soil conditioning in agriculture, forestry, construction and civil engineering, mining, environmental conservation, protection of rivers and delta against pollution, water storage or transportation.

11. The process according to claim 10, comprising performing soil conditioning in agriculture, and performing the aerial application in crop fields between planting and a subsequent first rain event or irrigation.

12. The process according to claim 1, wherein the aerial application is performed at an altitude below 50 m.

* * * * *